US011390757B2

(12) United States Patent
Lechner et al.

(10) Patent No.: US 11,390,757 B2
(45) Date of Patent: Jul. 19, 2022

(54) COATED SPRING

(71) Applicants: THYSSENKRUPP FEDERN UND STABILISATOREN GMBH, Hagen (DE); thyssenkrupp AG, Essen (DE)

(72) Inventors: Dieter Lechner, Düsseldorf (DE); Pashalis Simos, Herborn (DE); Kerstin Hymon, Warstein (DE); Marcel Gross, Dortmund (DE)

(73) Assignees: THYSSENKRUPP FEDERN UND STABILISATOREN GMBH, Hagen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/768,473

(22) PCT Filed: Oct. 14, 2016

(86) PCT No.: PCT/EP2016/074777
§ 371 (c)(1),
(2) Date: Apr. 13, 2018

(87) PCT Pub. No.: WO2017/064286
PCT Pub. Date: Apr. 20, 2017

(65) Prior Publication Data
US 2019/0024745 A1 Jan. 24, 2019

(30) Foreign Application Priority Data
Oct. 16, 2015 (DE) ...................... 10 2015 220 230.5

(51) Int. Cl.
F16F 1/02 (2006.01)
C09D 5/03 (2006.01)
C09D 163/00 (2006.01)

(52) U.S. Cl.
CPC .............. C09D 5/03 (2013.01); C09D 5/038 (2013.01); Y10T 428/261 (2015.01); Y10T 428/268 (2015.01)

(58) Field of Classification Search
CPC combination set(s) only.
See application file for complete search history.

(56) References Cited

U.S. PATENT DOCUMENTS

| 4,917,960 | A | * | 4/1990 | Hornberger | ............ | C09D 5/103 428/560 |
|---|---|---|---|---|---|---|
| 6,346,292 | B1 | | 2/2002 | Grubb | | |
| 6,663,968 | B2 | | 12/2003 | Grubb | | |
| 6,677,032 | B1 | | 1/2004 | Grubb | | |
| 7,018,716 | B2 | | 3/2006 | Grubb | | |
| 2002/0090823 | A1 | * | 7/2002 | Grubb | .................... | B05D 7/546 438/699 |
| 2004/0010167 | A1 | | 1/2004 | Miura | | |
| 2004/0101670 | A1 | | 5/2004 | Grubb et al. | | |
| 2016/0257845 | A1 | * | 9/2016 | Park | ........................ | F16F 1/024 |

FOREIGN PATENT DOCUMENTS

| CN | 1875128 | A | 12/2006 |
|---|---|---|---|
| CN | 101035630 | A | 9/2007 |
| CN | 102690588 | A | 9/2012 |
| CN | 103952701 | A | 7/2014 |
| DE | 2323878 | A | 11/1974 |
| DE | 2713932 | A | 10/1977 |
| EP | 0994141 | A | 4/2000 |
| EP | 2565240 | A | 3/2013 |
| JP | H02014257 | A | 1/1990 |
| JP | H10-296182 | A | 11/1998 |
| JP | 2007313475 | A | 12/2007 |
| KR | 2000-0016805 | A | 3/2000 |
| SU | 968526 | A | 10/1982 |
| WO | 97048772 | A | 12/1997 |
| WO | 2007138396 | A | 12/2007 |
| WO | 2009092773 | A | 7/2009 |
| WO | 2011012627 | A | 2/2011 |
| WO | 2015063024 | A | 5/2015 |

OTHER PUBLICATIONS

Tanaka et al., WO1997048772, Dec. 24, 1997 (machine translation) (Year: 1997).*
State Standard (GOST) 9.410-88 "Unified system of corrosion and ageing protection. Powder polymeric coatings. Typical technological processes." pp. 176-199, Jul. 1, 1990). (English translation of relevant passages from Russian Office Action enclosed).
English Translation of International Search Report issued in PCT/EP2016/074777, dated Dec. 12, 2016 (dated Dec. 20, 2016).

* cited by examiner

Primary Examiner — Cheng Yuan Huang
(74) Attorney, Agent, or Firm — thyssenkrupp North America, LLC

(57) ABSTRACT

An electrically conductive component, which can be used in motor vehicles, may include a surface having a layered covering. The layered covering may be a melted and cured product of coating with a powder composition. Further, the layered covering may have a layer thickness of greater than 150 μm, and the layered covering may be a single-layer covering. The layered covering may also include a pore-like layer structure. The pore-like layer structure of the layered covering may be responsible for an at-least-15% reduction in density of the layered covering relative to a density of the layered covering without the pore-like layer structure.

16 Claims, 1 Drawing Sheet a)  b)  c)

COATED SPRING

CROSS REFERENCE TO RELATED APPLICATIONS

This application is a U.S. National Stage Entry of International Patent Application Serial Number PCT/EP2016/074777, filed Oct. 14, 2016, which claims priority to German Patent Application No. DE 10 2015 220 230.5, filed Oct. 16, 2015, the entire contents of both of which are incorporated herein by reference.

FIELD

The present disclosure generally relates to electrically conductive components, including springs or torsion bars for motor vehicles.

BACKGROUND

Electrically conductive components, especially those with metal surfaces, are known in a multiplicity of embodiments in the prior art. Electrically conductive components, more particularly the surface thereof, are usually subject to highly varying external conditions, such as, for example, chemical reactions, especially reductions or oxidations, physical conditions, especially forces and impulses on to the surface of the electrically conductive components, examples being (stone) impacts, and, for example, environmental conditions, especially regionally and seasonally differing climatic conditions, such as fluctuations in humidity and temperature, for example. As a result of these varying conditions, conventional electrically conductive components are susceptible to surface damage, more particularly physical damage, corrosion, and combinations thereof. In light of this, conventional electrically conductive components are coated. In the prior art this is customarily accomplished either with a single-coat finish or else with a two-coat finish, consisting of a zinc primer as a first coat and an epoxy varnish as a second coat. A problem affecting single-coat finishes and/or two-coat finishes known in the prior art is their inadequate (stone) impact and (low-temperature) impact resistance, particularly at temperatures below the freezing point. In the case of conventional electrically conductive components damaged by (stone) impact, the two-coat finish is partly damaged and the surface is subject in particular to physical damage, corrosion, or combinations thereof. In particular, in the case of electrically conductive components damaged by (low-temperature) impact from the prior art, the two-coat finish is partly delaminated and the surface is subject to corrosion processes.

EP0994141B1 discloses, for example, coatings, especially dual coatings on objects made from high-tensile steel.

One of the problems addressed by the present disclosure is therefore that of providing an improved electrically conductive component, more particularly an improved coil spring, torsion bar spring and/or a stabilizer for motor vehicles, and a method for coating an electrically conductive component, with which the aforementioned disadvantages are avoided. In particular, the intention with this improved electrically conductive component is to enable a (low-temperature) impact resistance that is improved by comparison with conventional electrically conductive components, more particularly under extreme (environmental) conditions, such as, for example, at temperatures below the freezing point. Moreover, the intention with this improved electrically conductive component and more particularly its coating is to provide a capacity for energy absorption, particularly on the part of the coating, that is improved by comparison with conventional electrically conductive components. The intention, furthermore, is to at least increase the (penetrative) impact strength of the improved electrically conductive component under (stone) impact exposure in comparison to conventional electrically conductive components, and more particularly the intention is to prevent penetrative impacts through the coating on to the surface of the electrically conductive component. The intention, moreover, is to at least reduce the susceptibility to physical damage, more particularly susceptibility to corrosion, after (stone) impact exposure, and more particularly to prevent corrosion of these improved electrically conductive components. The intention, furthermore, with the improved method for coating an electrically conductive component is to provide a stable manufacturing operation which can be implemented simply and reliably into existing processes. The possibility is also to exist of being able to custom-set a mandated stone impact resistance and/or low-temperature impact resistance on the part of this improved electrically conductive component.

DETAILED DESCRIPTION

Figure 1:
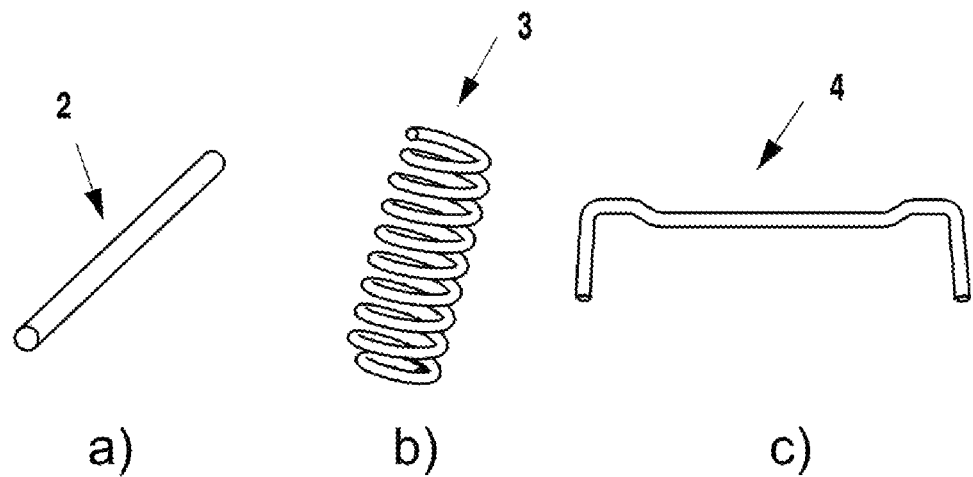
FIG. 1a is a diagrammatic view of a prior art torsion rod spring.
FIG. 1b is a diagrammatic view of a prior art coil spring.
FIG. 1c is a diagrammatic view of a prior art stabilizer.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to electrically conductive components such as, for example, springs and torsion bars for motor vehicles. The present disclosure also generally relates to layered coverings on electrically conductive components such as, for example, springs and torsion bars. Still further, the present disclosure generally relates to methods for coating electrically conductive components such as, for example, springs and torsion bars.

Relative to conventional electrically conductive components, the electrically conductive component of the invention features improved (stone) impact and (low-temperature) impact resistance, especially at temperatures below the freezing point. With the electrically conductive component of the invention, moreover, it is possible to realize savings in material while achieving stone and low-temperature impact resistance equal to or better than that of conventional electrically conductive components. More particularly, in contrast to conventional electrically conductive components, the electrically conductive component of the invention requires no two-coat finish and more particularly no zinc primer more than a first coat.

Relative to conventional coatings, the layered covering of the invention, at a given or lower total layer thickness of the coating, exhibits improved stone and low-temperature impact resistance, especially at temperatures below the freezing point. With the layered covering of the invention, moreover, in comparison to conventional coatings, it is possible to realize savings in terms of material. In particular, the layered covering of the invention requires no two-coat finish and more particularly no zinc primer more than a first coat.

The method of the invention for coating a surface of an electrically conductive component has the advantage over conventional methods that for given or lower total layer thicknesses, it is possible to realize the same or improved stone and low-temperature impact resistance, especially at temperatures below freezing point. Moreover, the desired (stone) impact resistance can be set simply and in a customized way, in particular by way of the layer thickness. Furthermore, with the method of the invention, the application of the coating composition to the surface, especially of steel, electrically conductive nonferrous metals, such as, for example, aluminum, copper, magnesium, and alloys thereof, carbon fiber materials, electrically conductive plastics, fiber composite materials, or combinations thereof, can be carried out more simply and more rapidly and does not require a separate application system for a further coating composition. Another advantage of the method of the invention is that it can be integrated simply and reliably into existing processes. With the method of the invention, moreover, in comparison to conventional two-coat processes, one layer application step fewer is needed, and in particular no zinc primer more than a first coat is applied.

A subject of the invention, therefore, is an electrically conductive component, especially for motor vehicles, comprising a surface with a layered covering, the layered covering being the melted and cured product of coating with a powder composition, and the layered covering having a layer thickness, wherein the layered covering is a single-layer covering and comprises a porelike layer structure and has the layer thickness of greater than 150 µm.

A further subject of the invention is a layered covering on a surface of an electrically conductive component, the layered covering being the melted and cured product of coating with a powder composition, and the layered covering having a layer thickness, wherein the layered covering is a single-layer covering and comprises a porelike layer structure and has the layer thickness of greater than 150 µm.

The layered covering is disposed more particularly on electrically conductive components of motor vehicles.

A further subject of the invention is a method for coating a surface of an electrically conductive component, more particularly for motor vehicles, with the steps of:
a) providing an electrically conductive component having a surface;
b) providing a powder composition comprising at least one binder component;
c) pretreating the surface of the electrically conductive component provided in step a), said pretreating being carried out as a mechanical and/or chemical pretreating;
d) drying the surface of the electrically conductive component, pretreated in step c), at least until the surface of the electrically conductive component comprises no liquid, more particularly no water;
e) powder-coating the surface of the electrically conductive component, dried in step d), with the powder composition provided in step b), comprising
  i. charging the powder composition provided in step b);
  ii. grounding the electrically conductive component with the surface dried in step d) and producing an electrically conducting component;
  iii. applying, more particularly spray-applying, the powder composition charged in step i) to the surface, dried in step d), of the electrically conducting component grounded in step ii.);
  iv. crosslinking, more particularly baking, the powder composition applied in step iii., at a crosslinking temperature, to produce a layered covering, wherein a powder-coated surface of the electrically conductive component is generated;
wherein in step b) a powder composition is provided which comprises at least one expanding agent component, and the powder coating in step e) is carried out in single-layer form, and the layered covering produced in step e) iv. is formed as one layer with a layer thickness of greater than 150 µm.

A further subject of the invention is the use of a layered covering of the invention as a corrosion- and abrasion-resistant protective covering for surfaces of electrically conductive components in the automotive, electrical and electronics, and mechanical engineering industries, in aerospace, and also for surfaces of electrically conductive components of sports equipment.

The invention may be actualized not only in the electrically conductive component of the invention but also in the layered covering of the invention, and also in the method of the invention for coating a surface of the electrically conductive component, and also in the inventive use of the layered covering of the invention.

For the purposes of the present invention, "electrically conductive" refers to the capacity to conduct electric current and is also termed electrical conductivity. Electrical conductivity as a physical variable is defined as the proportionality constant between the current density and the electric field strength, and the derived SI unit of electrical conductivity is S/m (siemens per meter). An electrically conductive component for the purposes of the present invention refers to a component having the ability to conduct electric current.

Examples of electrically conductive components are selected from a group of coil springs, especially coil compression springs, coil tension springs, conical springs, elastic springs, flexible springs, especially spiral springs, wound torsion springs, torsion bar springs, especially stabilizers, and combinations thereof.

A torsion rod spring, more particularly a torsion rod, is understood in the context of the present invention to be a rodlike and/or tubular component, more particularly comprising a plastics composition, carbon fiber composition, fiber composite material composition, metal composition, or combinations thereof, in which, with fixed clamping at both ends, the fastened ends perform a mutual pivoting movement about the torsion (rod spring) axis. In particular, the mechanical stress takes place substantially by way of a torque that engages tangentially to the torsion (rod spring) axis. Torsion rod springs are understood for example to include a straight torsion rod, an angular torsion rod, a torsion spring, a stabilizer torsion rod, a stabilizer, a split stabilizer, and combinations thereof.

For the purposes of the present invention, a powder composition refers to a composition in particulate form which is electrically conductive, more particularly electrically chargeable. Charging may be accomplished in particular by means of high voltage, such as, for example, a corona charging or ionization, or by friction, such as by triboelectric or electrokinetic charging, for example. The powder composition of the invention can be applied electrostatically, for example. A powder composition of the invention is more particularly a composition having a solids fraction of 100%, allowing the formation of a powder coating finish comprising one or more binders and/or binder systems. The primary feature of the binders and/or binder systems is the capacity for crosslinking. In particular, through selection of the binder(s) and/or binder systems, fundamental properties of the coating film produced after baking are determined, with examples being surface quality, hardness, and stability. Binders and/or binder systems are selected, for example, from a group of epoxy resins, carboxyl- and/or hydroxyl-containing polyesters, acrylate resins, especially OH and GMA acrylate resins, polyamides, polyethylene, polyvinyl chloride, polyvinylidene chlorides, polyurethane, and combinations thereof. The powder composition may further comprise additional powder composition components, such as additives, colorants and/or fillers, for example. Additives in particular influence parameters, such as for example surface quality, especially leveling, structure, gloss, surface hardness, and processing conditions.

A powder composition comprises, for example, 73 to 93 wt % of an epoxy resin component, 5 to 25 wt % of an elastomer component, and 2 to 3 wt % of an expanding agent component, based on 100 wt % of the powder composition. A powder composition may in particular comprise a fibrous substance components as a further additive. The elastomer component is selected in particular from a group of carboxyl-terminated butadiene/acrylonitrile rubber, bisphenol A epoxy resins, such as, for example, poly(bisphenol A-co-epichlorohydrin), 4,4'-(2,2-propanediyl)diphenol-2-(chloromethyl)oxirane, poly(bisphenol A-co-epichlorohydrin), glycidyl end-capped, and combinations thereof.

A single-layer covering for the purposes of the present invention is a layered covering which has the chemical properties of the same kind over the entire three-dimensional region of the layered covering. A single-layer covering comprises, in particular, a single composition and no layer transition/transitions. For example, over the entire three-dimensional region of the single-layer covering, the composition, and more particularly the matter, of the single-layer covering is homogeneous. In particular, a single-layer covering also includes a layered covering produced by multi-ply application of a homogeneous powder composition, which is crosslinked to form a single layer in the course of a crosslinking operation.

For the purposes of the present invention, a layer thickness refers to the difference in height between the outer surface of the single-layer covering and the outer surface of the electrically conductive component.

Customarily, the layer thickness, in particular the layer thickness in the case of metal substrates, can be measured out by techniques that are destructive of material and/or by nondestructive techniques. In the case of a technique destructive of material, in particular, a polished section is prepared from the electrically conductive component coated with a layered covering, and the layer thickness is measured on an optically magnified image of the polished section, such as under a microscope, for example. In the case of nondestructive measurement techniques, the accuracy of the measurement is customarily lower by comparison with the techniques destructive of material. The methods on which the nondestructive measurement techniques are based are, for example, those of magnetic-inductive measurement for steel substrates, and of measurement by eddy current methods for substrates made of other metals.

In a further preferred embodiment of the electrically conductive component, the layered covering has the layer thickness preferably in a range between 200 µm to 2000 µm, more preferably in a range between 250 µm to 1500 µm, very preferably in a range between 300 µm to 900 µm.

In a further preferred embodiment of the electrically conductive component, the layered covering comprises less than 3 weight % of one or more corrosion inhibitors, based on the layered covering.

A corrosion inhibitor for the purposes of the present invention is a composition which reduce, and more particularly inhibit, the corrosion rates of metals and metal compounds. Anticorrosion pigments are employed in particular. Anticorrosion pigments are selected, for example, from a group of zinc compounds, more particularly hydroxides, oxides, and carbonates thereof, as selected for example from diethylzinc, zamak, zinc acetate, zinc chloride, zinc oxide, zinc sulfide, zinc stearate, zinc carbonate, phosphate compounds, more particularly aluminum orthophosphate compounds, aluminum dihydrogen triphosphate, carbon black, and combinations thereof.

For the purposes of the present invention, an expanding agent component means a composition which releases at least one gas at least during the crosslinking of the applied powder composition in step e) iv. Gas that is released forms bubbles in particular, preferably during crosslinking operations. The expanding agent component may be selected, for example, from a group of N,N-azobisisobutyronitriles, more particularly 2,2'-azobisisobutyronitrile, nitroisopentamethylene-tetramines, more particularly dinitroisopentamethylenetetramine, toluenesulfonyl hydrazine, more particularly 4-methylbenzene sulfonohydrazide, hydrogen carbonates, carbonic diammoniate, silicone hydroxides, azodicarboxamide, sodium tetrahydroborate, aluminum trihydrate, phosphate compounds, more particularly diphosphates, triphosphates, and polyphosphates, and combinations thereof.

The effect of the release of the at least one gas, in particular, is the formation of a porelike layer structure which has a density reduced by at least 15%, preferably 20% to 70%, more preferably 25% to 60%, very preferably 30% to 50%, in relation to the density of the layered covering without the porelike layer structure.

In a further preferred embodiment, the electrically conductive component is produced by a method with the following steps:
a) providing an electrically conductive component having a surface;
b) providing a powder composition comprising at least one binder component;
c) pretreating the surface of the electrically conductive component provided in step a), said pretreating being carried out as a mechanical and/or chemical pretreating;
d) drying the surface of the electrically conductive component, pretreated in step c), at least until the surface of the electrically conductive component comprises no liquid, more particularly no water;
e) powder-coating the surface of the electrically conductive component, dried in step d), with the powder composition provided in step b), comprising i) charging the powder composition provided in step b);
ii. grounding the electrically conductive component with the surface dried in step d) and producing an electrically conducting component;
iii. applying, more particularly spray-applying, the powder composition charged in step i. to the surface, dried in step d), of the electrically conducting component grounded in step ii.;
iv. crosslinking, more particularly baking, the powder composition applied in step iii., at a crosslinking temperature, to produce a layered covering, wherein a powder-coated surface of the electrically conductive component is generated;

wherein the powder coating in step e) is carried out in single-layer form and the layered covering produced in step e) iv. is formed in a single layer and, after at least one steel ball impact pin impact test according to DIN ISO 4532 from October 1995 on the layered covering produced in step e) iv., exhibits no penetrative impact on to the (steel) surface of the electrically conductive component in the region of a site of impingement of the steel ball, the spring force set for the impact pin being 90 N and the layered covering of the coated electrically conductive component tested in the at least one steel ball impact pin impact test being conditioned to a temperature of −40° C.

For conditioning to −40° C., the coated electrically conductive component under test is stored for at least 24 h at a temperature of −40° C.+/−3° C.

In a further preferred embodiment, the electrically conductive component is produced by a method with the following steps:
a) providing an electrically conductive component having a surface;
b) providing a powder composition comprising at least one binder component;
c) pretreating the surface of the electrically conductive component provided in step a), said pretreating being carried out as a mechanical and/or chemical pretreating;
d) drying the surface of the electrically conductive component, pretreated in step c), at least until the surface of the electrically conductive component comprises no liquid, more particularly no water;
e) powder-coating the surface of the electrically conductive component, dried in step d), with the powder composition provided in step b), comprising
v. charging the powder composition provided in step b);
vi. grounding the electrically conductive component with the surface dried in step d) and producing an electrically conducting component;
vii. applying, more particularly spray-applying, the powder composition charged in step i. to the surface, dried in step d), of the electrically conducting component grounded in step ii.;
viii. crosslinking, more particularly baking, the powder composition applied in step iii., at a crosslinking temperature, to produce a layered covering, wherein a powder-coated surface of the electrically conductive component is generated;

wherein the powder coating in step e) is carried out in single-layer form and the layered covering produced in step e) iv. is formed in a single layer and, after at least one steel ball impact pin impact test according to DIN ISO 4532 from October 1995 on the layered covering produced in step e) iv., the (steel) surface of the electrically conductive component is at least partially exposed in the region of a site of impingement of the steel ball, the partially exposed (steel) surface having a length of less than 2 mm, preferably less than 1.6 mm, more preferably of less than 1.4 mm, very preferably of less than 1.2 mm, the spring force set for the impact pin being 90 N and the layered covering of the coated electrically conductive component(s) tested in the at least one steel ball impact pin impact test being conditioned to a temperature of −40° C.

For conditioning to −40° C., the coated electrically conductive component under test is stored for at least 24 h at a temperature of −40° C.+/−3° C.

In a further preferred embodiment, the electrically conductive component is produced by a method with the following steps:
a) providing an electrically conductive component having a surface;
b) providing a powder composition comprising at least one binder component;
c) pretreating the surface of the electrically conductive component provided in step a), said pretreating being carried out as a mechanical and/or chemical pretreating;
d) drying the surface of the electrically conductive component, pretreated in step c), at least until the surface of the electrically conductive component comprises no liquid, more particularly no water;
e) powder-coating the surface of the electrically conductive component, dried in step d), with the powder composition provided in step b), comprising
i. charging the powder composition provided in step b);
ii. grounding the electrically conductive component with the surface dried in step d) and producing an electrically conducting component;
iii. applying, more particularly spray-applying, the powder composition charged in step i. to the surface, dried in step d), of the electrically conducting component grounded in step ii.;
iv. crosslinking, more particularly baking, the powder composition applied in step iii., at a crosslinking temperature, to produce a layered covering, wherein a powder-coated surface of the electrically conductive component is generated;

wherein the powder coating in step e) is carried out in single-layer form and the layered covering produced in step e) iv. is formed in a single layer and after a (stone) impact test, the steel surface in the region under test is covered by the layered covering, the (stone) impact test involving blasting at least one blasting agent, accelerated between two wheels, at least on to the layered covering region under test for 60 s, with the peripheral speed of the wheels being 80 km/h, the amount of blasting agent being 200 g, and the blasted electrically conductive component being rotated at a speed of 30 $\text{min}^{-1}$.

The blasting agent used comprises, in particular, basalt chippings having a particle size in the range from 2 to 5 as can be used in asphalt monitored according to RGmin. As the distance between the two wheels to the electrically conductive component under test, 350 mm are set from the middle of an imaginary line between the center points of the two wheels perpendicularly up to the center point of the electrically conductive component under test.

To test whether the (steel) surface is covered by the layered covering in the region under test, preference is given to carrying out a corrosion test in artificial atmospheres—salt spray mist testing in accordance with DIN EN ISO 9227.

According to a further, preferred embodiment, the layered covering has the layer thickness preferably in a range between 200 μm to 2000 μm, more preferably in a range between 250 μm to 1500 μm, very preferably in a range between 300 μm to 900 μm.

According to a further preferred embodiment, the layered covering comprises less than 3 weight % of one or more corrosion inhibitors, based on the layered covering.

In a further advantageous embodiment of the invention, the layered covering with the porelike layer structure has a density which is reduced by at least 15%, preferably 20% to 70%, more preferably 25% to 60%, very preferably 30% to 50%, in relation to the density of the layered covering without the porelike layer structure.

According to a further, possible embodiment of the invention, the porelike layer structure comprises pores having a mean pore diameter of greater than 5 µm, preferably in a range between 10 µm to 250 µm, more preferably in a range between 15 µm to 200 µm, very preferably in a range between 20 µm to 150 µm. The mean pore diameters are in particular in a range between 60 µm to 75 µm.

In one preferred embodiment of the invention, the layered covering comprises no corrosion inhibitor, more particularly no zinc component, such as zinc powders, for example.

According to a further preferred embodiment of the invention, the layered covering comprises at least 10 weight %, preferably 15 to 90 weight %, more preferably 20 to 80 weight %, very preferably 25 to 75 weight % of a fiber component, based on the layered covering.

For the purposes of the present invention, a fiber component refers to a component which provides structural fiber reinforcement to the layered covering, more particularly to the matrix of the layered covering. The fiber component is selected for example from a group of glass fibers, aramid fibers, more particularly fibers of poly(p-phenyleneterephthalamide), poly(m-phenyleneterephthalamide), polyhaloolefin fibers, more particularly fibers of polytetrafluoroethylene, polychlorotrifluoroethylene, carbon fibers, and combinations thereof.

According to a further possible embodiment of the invention, the layered covering comprises at least one epoxy resin component.

Mechanical pretreating for the purposes of the present invention refers to a surface enlargement, more particularly roughening of the surface and/or compaction of the surface of the electrically conductive component. Mechanical pretreating may be carried out, for example, by blasting methods, especially shot blasting.

For the purposes of the present invention, a chemical pretreating refers to the formation of a conversion surface on the surface of the electrically conductive component. The conversion surface that is formed covers over the surface of the electrically conductive component, in particular. The chemical pretreating is carried out, for example, as phosphating.

According to a further preferred embodiment, the single-layer layered covering produced in step e) iv. is formed with a layer thickness preferably in a range between 200 µm to 2000 µm, more preferably in a range between 250 µm to 1500 µm, very preferably in a range between 300 µm to 900 µm.

According to a further preferred embodiment, a powder composition is provided in step b) which comprises less than 3 weight % of one or more corrosion inhibitors, based on the layered covering.

In one preferred embodiment of the invention, in the powder coating in step e), the layered covering produced in step e) iv. is formed with a porelike layer structure.

According to a further preferred embodiment of the invention, the layered covering produced in step e) iv. with the porelike formed layer structure is formed with a density which is reduced by at least 15%, preferably 20% to 70%, more preferably 25% to 60%, very preferably 30% to 50%, in relation to the density of the layered covering without the porelike layer structure.

According to a further possible embodiment of the invention, in the powder coating in step e), the layered covering produced in step e) iv. is formed with a porelike layer structure and the layered covering produced in step e) iv. with the porelike formed layer structure is formed with a density which is reduced by at least 15%, preferably 20% to 70%, more preferably 25% to 60%, very preferably 30% to 50%, in relation to the density of the layered covering without the porelike layer structure.

According to a further, possible embodiment of the invention, the layered covering produced in step e) iv. with the porelike formed layer structure is formed with pores having a mean pore diameter of greater than 5 µm, preferably in a range between 10 µm to 250 µm, more preferably in a range between 15 µm to 200 µm, very preferably in a range between 20 µm to 150 µm.

In one preferred embodiment of the invention, the grounding of the electrically conductive component in step e) ii) takes place as a step further ahead in the sequence, more particularly after the providing of an electrically conductive component in step a).

According to a further preferred embodiment of the invention, before the powder coating in step e), in a further step g), a heating is carried out, more particularly of the electrically conductive component dried in step d), at least to a heating temperature, the heating temperature being a temperature in a range from 30° C. below the gelling onset temperature up to the final crosslinking temperature of the powder composition provided in step b). Examples of gelling onset temperatures are greater than 50° C., preferably in a range between 70° C. to 140° C.

For the purposes of the present invention, gelling onset temperature refers to the temperature at which the powder composition provided begins to form gel. Gel formation is, in particular, the start of the crosslinking of one or more components of the powder composition provided.

Crosslinking end temperature in the context of the present invention refers to the maximum temperature at which there is as yet no decomposition of individual and/or plural components of the powder composition. In particular, the mechanical properties, such as the adhesion of the layered covering to the surface of the electrically conductive component, for example, decrease if the crosslinking temperature is exceeded.

In one preferred embodiment of the invention, a powder composition is provided in step b) which comprises no corrosion inhibitor, more particularly no zinc component, such as zinc powders, for example.

According to a further preferred embodiment of the invention, in step b) a powder composition is provided which comprises at least one fiber component and wherein, during the powder coating in step e), the layered covering produced in step iv. is formed with at least 10 weight %, preferably 15 to 90 weight %, more preferably 20 to 80 weight %, very preferably 25 to 75 weight % of the fiber component, based on the layered covering produced.

According to a further preferred embodiment of the invention, in the powder composition provided in step b), an epoxy resin component is provided as at least one binder component.

The electrically conductive component of the invention is elucidated, as—by way of example—a spring of the invention or torsion rod of the invention, by means of the examples and drawings.

FIG. 1 shows different springs according to the prior art, with the designations a) to c). A torsion rod spring 2 is shown under a). The designation b) represents a coil spring 3, and c) represents a stabilizer 4.

Figure 2:
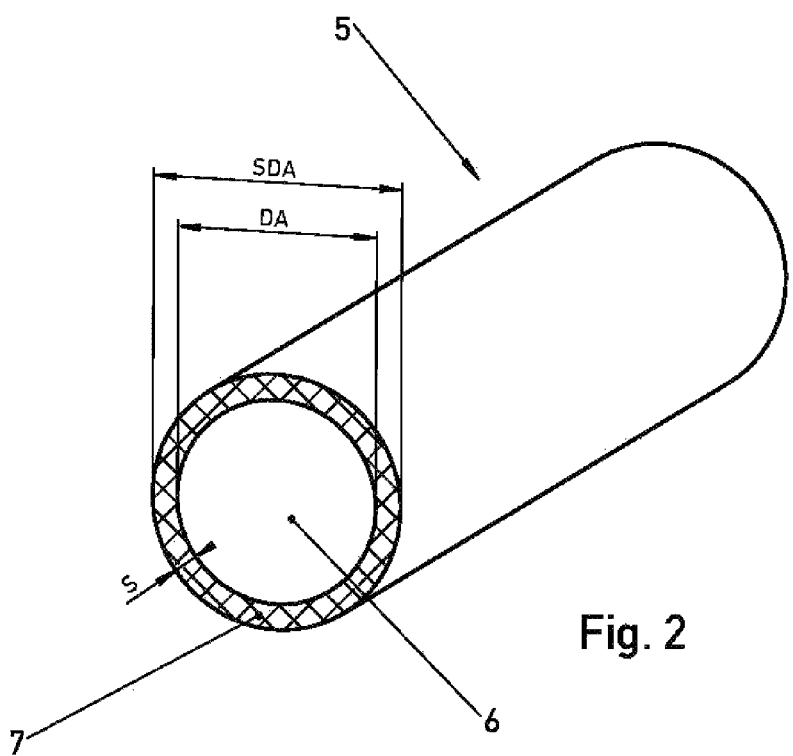
FIG. 2 is a diagrammatic oblique view of an example metal tube element or an example metal rod element of a spring or a torsion rod of the present disclosure.

FIG. 2 shows an oblique view of a metal tube element or metal rod element 5 of a spring or of a torsion rod, coated with a layered covering 7, according to one embodiment of the invention. The metal tube element or metal rod element 5 has an outer diameter DA. The layered covering 7 is disposed on the outer surface of the metal tube element or metal rod element 5, and has a layer thickness S with an outer diameter of the layered covering SDA. The layer thickness S is half of the difference between the outer diameter of the layered covering SDA and the outer diameter DA.

Example 1

In example 1, stone impact bombardment was carried out at 80 km/h and the subsequent corrosion test was carried out according to DIN EN ISO 9227.

The stone impact testing was carried out under the following conditions:
peripheral speed of the drive wheel: 80 km/h,
test duration: 60 s,
test distance: 350 mm,
blasting medium: basalt chips, grading 2 to 5,
blasting medium quantity: 200 g,
rotary speed of the blasted component: 30 rpm.

The components under test were subsequently stored for 72 hours in the salt spray cabinet.

Table 1 below shows the results for 5 springs coated with an example coating of the present disclosure.

TABLE 1

Results for 5 springs coated with an example coating of the present disclosure.

| Spring No. | Penetrative impacts up to | Blistering, degree of blisters | Degree of rust |
|---|---|---|---|
| 2015_190_V2_1 | 0 | 0 (S0) | Ri 0 |
| 2015_190_V4_1 | 0 | 0 (S0) | Ri 0 |
| 2015_190_V4_2 | 0 | 0 (S0) | Ri 0 |
| 2015_190_V6_1 | 0 | 0 (S0) | Ri 0 |
| 2015_190_V7_1 | 0 | 0 (S0) | Ri 0 |

Example 2

In example 2, stone impact bombardment was carried out at 80 km/h and the subsequent corrosion test was carried out according to DIN EN ISO 9227.

The stone impact testing was carried out under the following conditions:
peripheral speed of the drive wheel: 80 km/h,
test duration: 60 s,
test distance: 350 mm,
blasting medium: No. 7 crushed stone of JIS A 5001,
blasting medium quantity: 200 g,
rotary speed of the blasted component: 2 rpm.

The components under test were subsequently stored for 24 hours in the salt spray cabinet.

Test conditions in the salt spray cabinet:
temperature in the cabinet: 35±2° C.,
air humidification temperature: 47±1° C.,
spraying pressure: 70 to 170 kPa,
amount: 1 to 2.0 ml/h per 80 $cm^2$,
pH: 6.5 to 7.2 (33 to 35° C.)

Table 2 below depicts the results for 4 springs (springs 1 to 4) coated with an example layered covering of the present disclosure. Additionally shown are the results for 4 springs (springs 5 to 8) coated with a single-layer system customary in the prior art. Apparent very clearly are the good results for degree of rust with the layered covering of the invention, relative to a coating customary in the prior art. A degree of rust Ri of 0 represents the absence of rust and means that there has been no corrosion of the spring. The degrees of rust Ri of 2.5 and 3 show that rust was present on the springs tested and therefore that corrosion of the springs has taken place.

TABLE 2

Contrasting of the springs of the invention featuring the layered covering of the invention, in comparison to a prior-art coating

| Spring No.: | Degree of rust | Coating |
|---|---|---|
| 1 | Ri 0 | inventive coating |
| 2 | Ri 0 | inventive coating |
| 3 | Ri 0 | inventive coating |
| 4 | Ri 0 | inventive coating |
| 5 | Ri 3 | single-layer system |
| 6 | Ri 3 | single-layer system |
| 7 | Ri 2.5 | single-layer system |
| 8 | Ri 3 | single-layer system |

Example 3

In example 3, the low-temperature impact testing was carried out according to TL 261 under the following conditions:

The springs for testing were stored for 24 h at (−40±3°) C. After the end of the storage time, an impact trial was carried out at low temperatures along the lines of DIN ISO 4532 (with 90 N testing force on rigid base).

Table 3 shows the results for 2 springs coated with an example coating of the present disclosure. Each spring was tested four times. Penetration impact Ø identifies the maximum measured length of the steel surface partially exposed in an impaction. From the table it is apparent that under fourfold bombardment, penetrative impact of the steel ball on to the steel surface of the springs was not recorded for either of the 2 springs tested. Layer thickness left and right, respectively, refer to the layer thickness measured to the left and right, respectively, of the impaction of the blasted steel ball.

TABLE 3

Results of low-temperature impact testing with fourfold bombardment of 2 springs coated in accordance with the invention.

| | Spring 2015_164_P VIII | | | |
|---|---|---|---|---|
| Bombardment | Penetrative impact Ø [mm] | Layer delamination | Layer thickness left [µm] | Layer thickness right [µm] |
| Bombardment 1 | 0.0 | none | 905 | 870 |
| Bombardment 2 | 0.0 | none | 806 | 803 |
| Bombardment 3 | 0.0 | none | 771 | 754 |
| Bombardment 4 | 0.0 | none | 851 | 837 |

TABLE 3-continued

Results of low-temperature impact testing with fourfold bombardment of 2 springs coated in accordance with the invention.

| | Spring 2015_164_3 | | | |
|---|---|---|---|---|
| Bombardment | Penetrative impact Ø [mm] | Layer delamination | Layer thickness left [μm] | Layer thickness right [μm] |
| Bombardment 1 | 0.0 | none | 1049 | 1002 |
| Bombardment 2 | 0.0 | none | 809 | 853 |
| Bombardment 3 | 0.0 | none | 1106 | 1064 |
| Bombardment 4 | 0.0 | none | 770 | 807 |

COMMERCIAL APPLICABILITY

Springs or torsion rods, more particularly in the form of a coil spring, torsion rod spring and/or stabilizer of the type described above, are used in the production of motor vehicles, particularly of chassis of motor vehicles.

LIST OF REFERENCE SYMBOLS

2=torsion rod
3=coil spring
4=stabilizer
5=element of a spring or of a torsion rod
6=metal rod or metal tube
7=layered covering
DA=outer diameter of the metal rod or metal tube
SDA=outer diameter of the layered covering
S=layer thickness

What is claimed is:

1. An electrically conductive component comprising a surface with a layered covering, wherein the layered covering
   has a layer thickness of greater than 150 μm,
   is a melted and cured product of coating with a powder composition,
   is a single-layer covering, and
   comprises a layer structure with pores having a mean pore diameter of greater than 5 μm, wherein the layer structure defines a direct boundary of each pore wherein the layered covering comprises less than 3% by weight of one or more corrosion inhibitors based on the layered covering, and wherein the layered covering comprises at least 10% by weight of a fiber component based on the layered covering.

2. The electrically conductive component of claim 1 wherein the layer structure with pores of the layered covering is responsible for an at-least-15% reduction in density of the layered covering relative to a density of the layered covering without the layer structure.

3. The electrically conductive component of claim 1 wherein the pores have a mean pore diameter in a range between about 10 μm and about 250 μm.

4. The electrically conductive component of claim 1 comprising an electrically conductive substrate comprised of a first material, wherein the layered covering is comprised of a second material that is different than the first material, wherein the single-layer covering is disposed directly on the electrically conductive substrate, wherein the layered covering is an outermost surface of the electrically conductive component.

5. The electrically conductive component of claim 4 wherein the electrically conductive substrate and the layered covering are configured as a torsion rod spring or a torsion rod.

6. The electrically conductive component of claim 4 wherein the layered covering is based on an electrostatically-applied powder composition disposed on the electrically conductive substrate.

7. The electrically conductive component of claim 4 wherein the powder composition comprises a crosslinking binder.

8. The electrically conductive component of claim 4 wherein based on 100% by weight of the powder composition, the powder composition comprises 73 to 93% by weight epoxy resin, 5 to 25% by weight elastomer, and 2 to 3% by weight expanding agent.

9. The electrically conductive component of claim 4 wherein a composition of the layered covering is homogenous throughout a volume of the layered covering, wherein the layered covering is free of any layer transitions.

10. The electrically conductive component of claim 4 wherein the corrosion inhibitor is an anticorrosion pigment.

11. The electrically conductive component of claim 4 wherein the pores in the layer structure reduce a density of the layer structure by 30 to 50% compared to an otherwise equivalent layer structure that lacks the pores.

12. The electrically conductive component of claim 4 wherein the layered structure comprises the fiber component that includes glass fibers; aramid fibers; fibers of poly(p-phenyleneterephthalamide) or poly(m-phenyleneterephthalamide); polyhaloolefin fibers; fibers of polytetrafluoroethylene, polychlorotrifluoroethylene, or carbon fibers; and combinations thereof.

13. The electrically conductive component of claim 4 wherein the layered covering comprises epoxy resin and has a thickness of between 300 and 900 μm.

14. The electrically conductive component of claim 13 wherein the mean pore diameter is between 20 and 150 μm.

15. The electrically conductive component of claim 4 wherein layers of the powder composition are cross-linked such that the layered covering is free of any layer transitions.

16. The electrically conductive component of claim 4 wherein the layered covering comprises a binder comprised of at least one of epoxy resin, carboxyl- and/or hydroxyl-containing polyester, acrylate resin, polyamide, polyethylene, polyvinyl chloride, polyvinylidene chloride, or polyurethane.

* * * * *